Sept. 12, 1939.  C. H. WEANT  2,172,719
MICROMETRIC ADJUSTING MECHANISM
Filed July 13, 1937
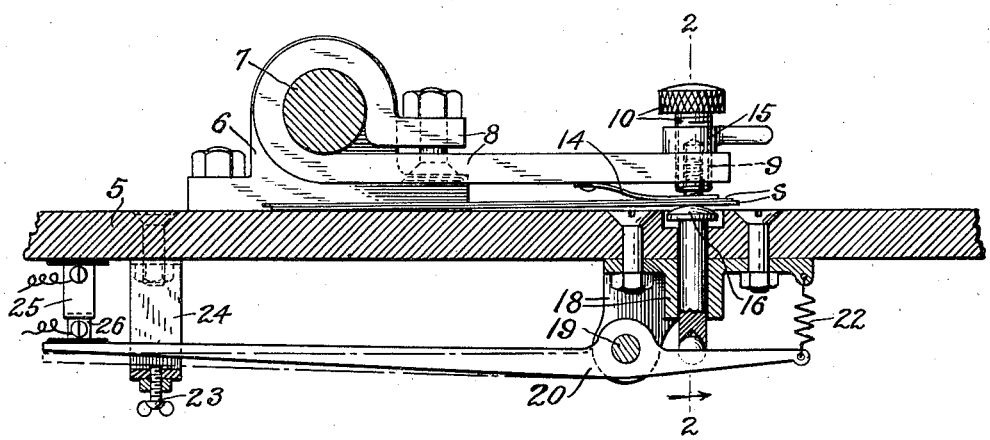
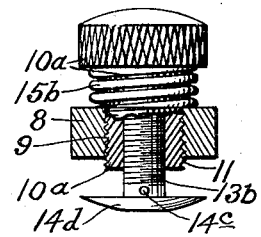
Fig. 4.
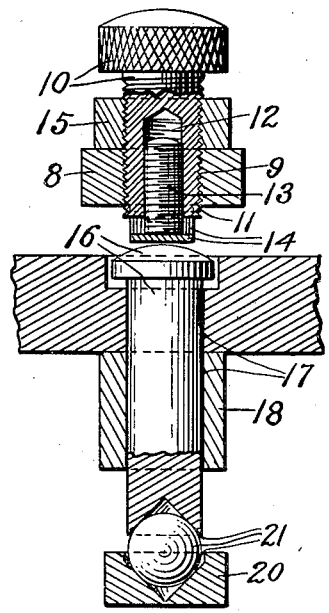
Fig. 2.
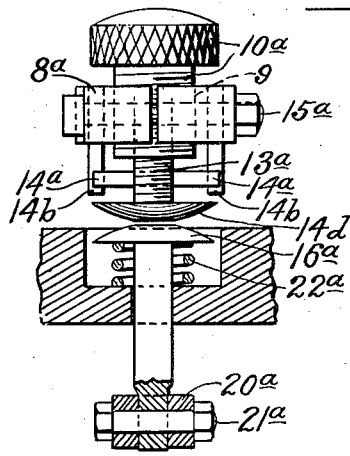
Fig. 3.
Inventor,
Clarence H. Weant.
By Sterling P. Buck,
Attorney.

Patented Sept. 12, 1939

2,172,719

UNITED STATES PATENT OFFICE 2,172,719

MICROMETRIC ADJUSTING MECHANISM

Clarence H. Weant, Baltimore, Md.

Application July 13, 1937, Serial No. 153,360

5 Claims. (Cl. 33—147)

This invention relates to gages, also to a gage-controlled or dimension-controlled indicator, also to an adjustable attachment for a sheet-feeding mechanism, and specifically to an adjusting mechanism for a sheet-feeding machine.

One object of this invention is to provide a sheet-feeding machine or mechanism with a very quickly, easily and accurately adjusting micrometric gage which not only indicates to the user any excess of thickness over a predetermined and desired thickness of material being fed by the machine, but also automatically controls the operation of the machine in such manner as to immediately cause the machine to stop feeding, so the excessively thick material can be removed before the feeding is continued or resumed.

Other objects and important features are pointed out or implied in the following explanations, in connection with the accompanying drawing in which:

Fig. 1 is a view, partly in elevation and partly in vertical section, illustrating one of the various applications of the invention, viz., in a sheet-feeding mechanism which is electrically operated or controlled.

Fig. 2 is an enlarged vertical sectional view along the line 2—2 of Fig. 1.

Fig. 3 is a view somewhat similar to Fig. 2, but showing a modified form of the micrometric gage.

Fig. 4 is a view, partly in section and partly in elevation, illustrating another modification of the micrometric adjusting element.

Referring to the drawing in detail, in which similar reference numerals refer to similar parts in the several views, the invention, as applied to a sheet-feeding machine, is described as follows:

The table or bed-plate of the machine will be hereinafter referred to as the plate 5, and in one or more bearings 6, on this bed or plate, a rock-shaft 7 is journaled; the means for rocking same being no part of this invention, so not shown.

An arm or rigid member 8 is clamped or otherwise fixed on said rock-shaft so as to rock with the latter in such manner that its free end moves slightly up and down during feeding operation of this mechanism. Said free end of the arm 8 is apertured and internally screw-threaded, the same being true of the arm 8a in Fig. 3. A hollow or axially bored screw 10, or 10a in Figs. 3 and 4, has an external screw-thread 11 of slightly greater pitch than that of its internal screw-thread 12, as is somewhat exaggerated in Figs. 3 and 4, the difference of pitch being, in practice, only about a thousandth or a few thousandths of an inch; and the helical direction of the outer and inner threads of this screw is the same, viz., both right-hand threads as here illustrated, though both left-hand threads would be just as effective in producing the micrometric adjustments desired for the purpose intended; for in either case, a complete turn of the screw 10 or 10a, within the member 8 or 8a and around a non-rotating screw 13, 13a or 13b, will move this internally fitted screw axially only the micrometric distance that corresponds to the difference in thread-pitches. To be more explicit, these screws 13, 13a and 13b are each in threaded interengagement with the internal screw-threads of the respective screws 10 and 10a. The screw 13 is united with a spring 14 that has one end secured to the member 8 in such relation as to prevent this screw 13 from turning, while permitting it to be moved axially toward and from the member 8; and the spring 14 also serves as a guide to prevent edges of the sheets s from abutting against the screw 13.

In Fig. 3, the screw 13a is prevented from turning by means of lateral extensions 14a that slide against studs 14b that project from the member 8a. In Fig. 4, a wire 14c may be either secured to the member 8 as is the spring 14 (Fig. 1), or extend between studs such as shown at 14a (Fig. 3). In Figs. 3 and 4, the screws 13a and 13b have heads or flanges 14d that serve as guides for the sheets as well as gage-contacts for cooperation with depressible gage-contacts to be described hereinafter.

Each screw 10 and 10a is provided with means to hold it against the slightest accidental axial movement such as may result from too loosely fitted threads; for instance, a manipulative lock-nut such as shown in Figs. 1 and 2, at 15; or a screw-clamp such as shown in Fig. 3, where the end of member 8a is slotted, laterally apertured, and provided with a screw or bolt 15a; or a compressed spring such as shown in Fig. 4, at 15b, seated on the member 8, and exerting considerable pressure against the manipulative head of the screw 10a. In Figs. 1, 2 and 4, the springs 14 and 14c serve to press the gage-contact screws toward the member 8, thereby compensating for any looseness of the threads thereof and of the bore of the manipulative screw.

The previously mentioned gage-contact may be of the form shown at 16 in Figs. 1 and 2, or at 16a in Fig. 3; or of any appropriate form not shown; but in Figs. 1 and 2 it is a depressible plunger-head, the shank of the plunger extending through an opening 17 of the plate 5 and of the bracket 18 which latter is bolted or otherwise secured to the plate 5 and includes a bearing-arm in which is journaled or secured a pintle or axle or journal 19 which supports an indicating lever 20. This lever is substantially pivotally connected to the shank of the gage-contact 16 by the ball-and-socket connection 21 of Figs. 1 and 2; or, as in Fig. 3, it may be positively pivoted as is the shank of gage-contact 16a, to the lever 20a, by the pivot 21a.

In Fig. 1, a spring 22 cooperates with a screw 23 and its support 24 for yieldingly holding the lever at a predetermined distance from an electric contact 25, inasmuch as the latter is intended to cooperate with a contact 26, on the lever 20, for opening and closing a circuit which may either operate the machine that feeds the sheets, or may merely control the machine or the feeding mechanism so as to prevent it from feeding after the circuit is closed; so, in any of these circumstances, the lever 20 or 20a serves as an indicating element to apprise the user as to any excess of thickness of material passing between the gage-contacts; for even if the electric contacts 25 and 26 be eliminated, the movement of the arm or lever 20 or 20a could be seen by the user, or other than electric means could be actuated by the lever for producing a visible or audible indication as to its movement by the excessive thickness of one or more pieces of material, such for instance as sheets s.

In lieu of the spring 22, a spring 22a may be employed as in Fig. 3, seated in a recess of the plate 5 and yieldingly supporting the gage-contact 16a.

*In operation.*—As the feeding of the sheets is effected by any (undisclosed) appropriate means, the arm 8 or 8a carries the adjusting element of the micrometric device or mechanism slightly upward for permitting free passage of the sheets thereunder, then downward to or substantially to the respective sheets being fed; and now assuming that two sheets are fed simultaneously, one on the other, this additional micrometric thickness of material cooperates with the micrometric gage-contacts for moving the lever 20 or 20a and thus indicating the presence of the excessive thickness of material.

*In adjusting for different thicknesses of sheets.*—If the mechanism is properly set or adjusted for a relatively thick material, and it is now desired to adjust it for a relatively thin material, a piece of such thin material is placed between the gage-contacts and the manipulative or adjusting screw is turned clockwise until the lever 20 or 20a is moved slightly, whereupon the manipulative screw can be turned counter-clockwise very slightly so that the lever will not be moved by sheets of that thickness, but will be moved by any excessive thickness of the material.

From the foregoing, it is evident that this invention is susceptible of numerous modifications and applications that come fairly within the scope of this invention as implied and as claimed hereinafter.

My invention is claimed as follows:

1. In a micrometric adjusting and feed controlling mechanism of a sheet-feeding machine, the combination of an apertured plate adapted to hold sheets of material to be fed thereon, feed-controlling means including operable elements under said plate and engaged with a depressible element in an aperture of said plate and provided with a gage-contact substantially flush with the top of said plate at a point where said sheets are fed thereover and thereagainst while moving across said plate, an internally screw-threaded member spaced above said plate, an internally and externally screw-threaded adjusting screw operatively engaged with the internal screw-threads of said member so as to be adjustable upward and downward relative thereto, and a second externally threaded screw provided with a gage-contact slightly spaced from the first said gage-contact, said second screw having its screw-thread interengaged with the internal screw-thread of said adjusting screw and being provided with means to prevent it from turning, the external screw-threads of both screws being in the same helical direction but being of slightly different pitches so each turn of the adjusting screw effects only a micrometric axial movement of the gage-contact of said second screw with respect to the first said gage-contact, whereby, after a micrometric adjustment is quickly and very accurately made with respect to the desired width of space between said gage-contacts, the latter will combine with fed sheet material of a thickness greater than said desired width, thereby controlling said sheet-feeding machine in one of the ways specified.

2. In a micrometric adjusting and feed-controlling mechanism of a sheet-feeding machine, the combination of an apertured plate to support sheets of solid material fed thereacross, feed-controlling means including operable elements under said plate and engaged with a depressible element in an aperture of said plate and provided with a gage-contact substantially flush with the top of said plate at a point where said sheets are fed thereover and thereagainst when being fed across said plate, an internally screw-threaded member spaced above said plate and provided with means to move it upward and downward, an internally and externally screw-threaded adjusting screw operatively engaged with the internal screw-thread of said internally screw-threaded member so as to move upward and downward therewith and to be adjustable upward and downward relative thereto, and a second externally screw-threaded screw provided with a gage-contact normally slightly spaced from the first said gage-contact, said second screw being operatively engaged with the internal screw-thread of said adjusting screw and being provided with frictionless means to prevent it from turning, the external screw-threads of said screws having the same helical direction but being of slightly different pitches so each turn of the adjusting screw effects only a micrometric axial movement of said second screw with respect to said internally screw-threaded member, for the purposes specified.

3. In an adjusting element of a micrometric mechanism, the combination of a member having an internally screw-threaded aperture therethrough, an adjusting screw having an internal screw-thread therein, said adjusting screw having an external screw-thread interengaged with the screw-thread of said aperture and operable for axial movement therein, a second screw provided with a gage-contact and with an external screw-thread which is interengaged with the internal screw-thread of said adjusting screw, means to prevent said second screw from turning while being movable axially by the turning of said adjusting screw, the external screw-threads of these interengaged screws having the same helical direction but having slightly different pitches, so that the resultant axial movement of said second screw equals the difference of pitches for each turn of the adjusting screw, and means to secure said adjusting screw against accidental movement with respect to the first said member.

4. The combination defined by claim 3, and frictional spring-pressed means operatively engaged with the said adjusting screw in a proper relation for preventing accidental movement of said adjusting screw with respect to the first said member while permitting said adjusting screw to be adjusted by manipulation against the resistance of said spring-pressed means.

5. The combination defined by claim 3, said adjusting screw having thereon a manipulative head, and a spring compressed between the first said member and said manipulative head so as to frictionally and elastically hold the manipulative head against accidental movement relative to the said member while permitting the manipulative member to be turned against resistance of said spring.

CLARENCE H. WEANT.